(12) United States Patent
Kim

(10) Patent No.: US 11,890,942 B2
(45) Date of Patent: Feb. 6, 2024

(54) CORNER MODULE OF VEHICLE

(71) Applicants: HYUNDAI MOTOR COMPANY, Seoul (KR); KIA MOTORS CORPORATION, Seoul (KR)

(72) Inventor: Eun Sik Kim, Gwangmyeong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 572 days.

(21) Appl. No.: 16/952,448

(22) Filed: Nov. 19, 2020

(65) Prior Publication Data

US 2021/0394610 A1 Dec. 23, 2021

(30) Foreign Application Priority Data

Jun. 17, 2020 (KR) .................. 10-2020-0073331

(51) Int. Cl.
| | | |
|---|---|---|
| B62D 7/14 | (2006.01) | |
| B60K 7/00 | (2006.01) | |
| B62D 5/04 | (2006.01) | |
| F16D 3/18 | (2006.01) | |
| F16D 49/00 | (2006.01) | |
| B60G 11/14 | (2006.01) | |
| B60B 27/00 | (2006.01) | |

(52) U.S. Cl.
CPC ............ B60K 7/0007 (2013.01); B60G 11/14 (2013.01); B62D 5/0418 (2013.01); B62D 7/14 (2013.01); F16D 3/185 (2013.01); F16D 49/00 (2013.01); B60B 27/0015 (2013.01); B60B 27/0047 (2013.01)

(58) Field of Classification Search
CPC .... B60K 7/0007; B60G 11/14; B62D 5/0418; B62D 7/14; F16D 3/185; F16D 49/00; B60B 27/0015; B60B 27/0047
USPC .......................................................... 180/55
See application file for complete search history.

(56) References Cited

U.S. PATENT DOCUMENTS

| 7,398,846 B2 * | 7/2008 | Young ...................... B60G 3/18 310/67 R |
| 11,584,427 B2 * | 2/2023 | Kuribayashi ............ B62D 7/18 |
| 11,646,628 B2 * | 5/2023 | Battistella .............. H02K 7/006 180/65.51 |
| 2018/0251123 A1 * | 9/2018 | Sigmar .................. B62D 17/00 |
| 2020/0207405 A1 * | 7/2020 | Kuribayashi ............ B60G 3/18 |
| 2020/0223478 A1 * | 7/2020 | Sano .................... B60G 15/062 |

* cited by examiner

Primary Examiner — John D Walters
Assistant Examiner — Hilary L Johns
(74) Attorney, Agent, or Firm — Morgan, Lewis & Bockius LLP

(57) ABSTRACT

A corner module of a vehicle includes: a suspension configured to be coupled to a vehicle body; a case configured to be coupled to the suspension and configured to be to be supported on the vehicle body via the suspension; an in-wheel motor disposed inside the case; a steering motor disposed inside the case; a first power transmission mechanism configured to connect the in-wheel motor and a vehicle wheel and configured to transmit a rotating force of the in-wheel motor to the vehicle wheel to drive the vehicle wheel; and a second power transmission mechanism configured to connect the steering motor and the vehicle wheel and configured to transmit a rotating force of the steering motor to the vehicle wheel to steer the vehicle wheel.

18 Claims, 15 Drawing Sheets

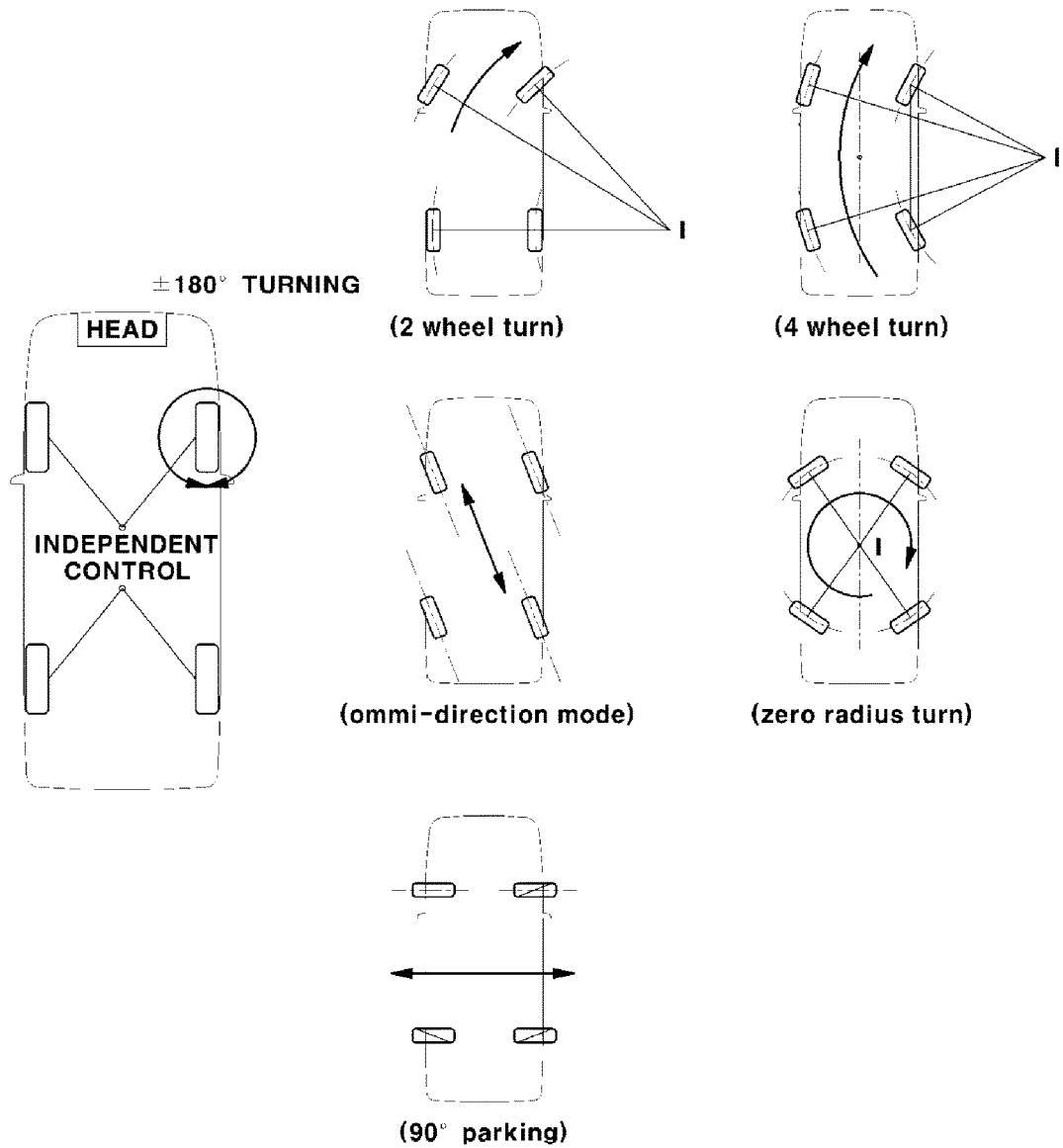
[FIG. 1] – PRIOR ART –

[FIG. 2]
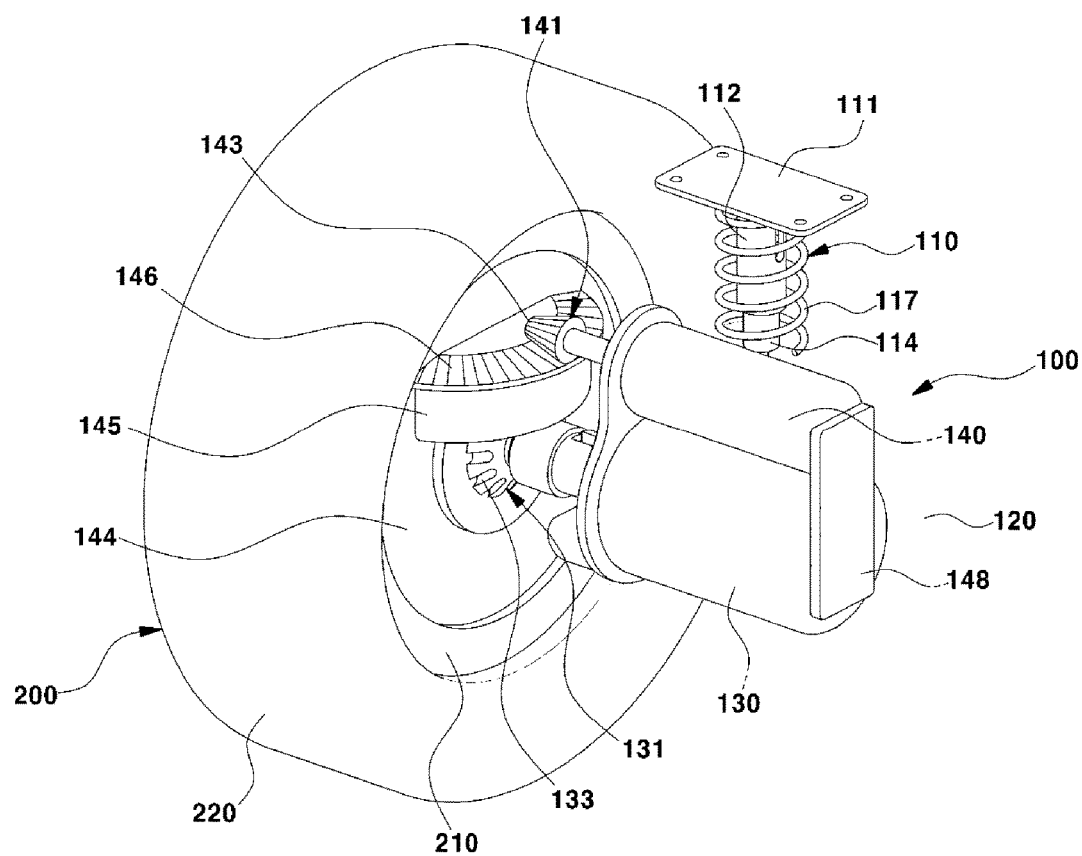

[FIG. 3]
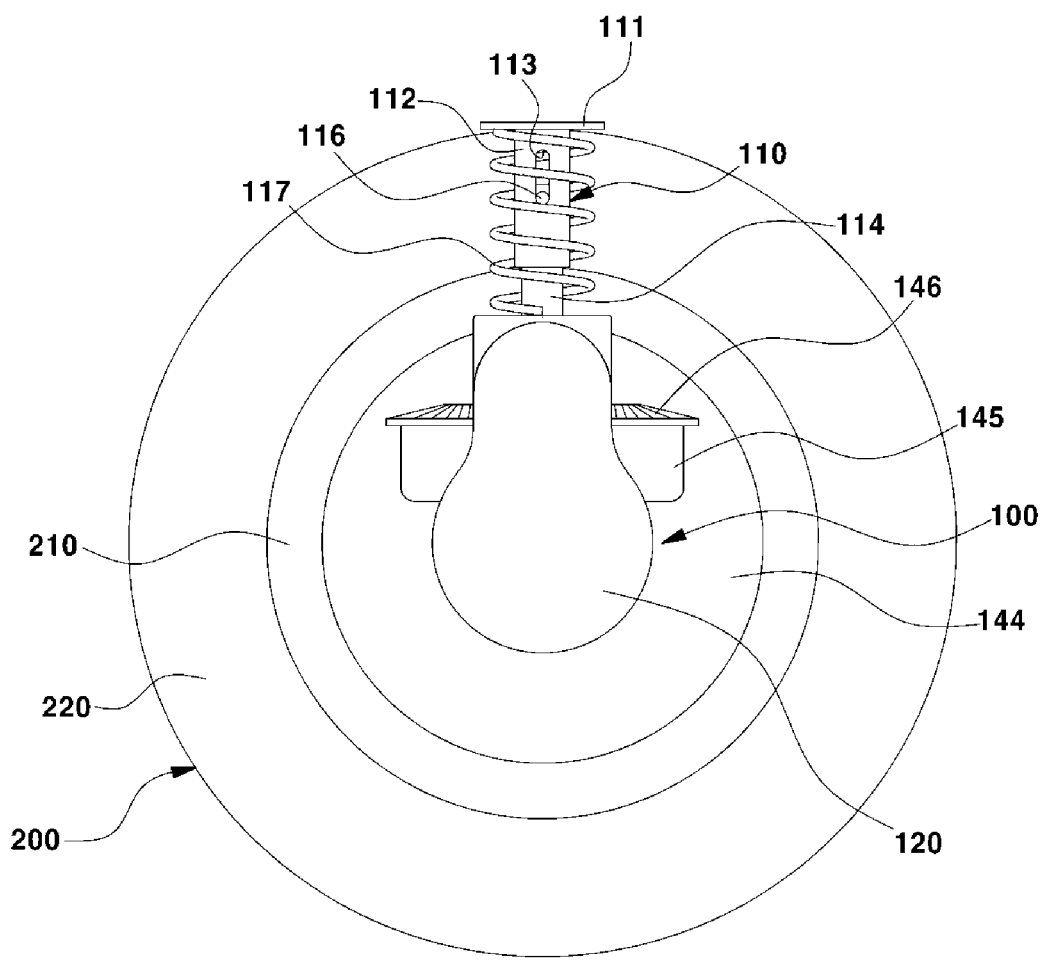

[FIG. 4]
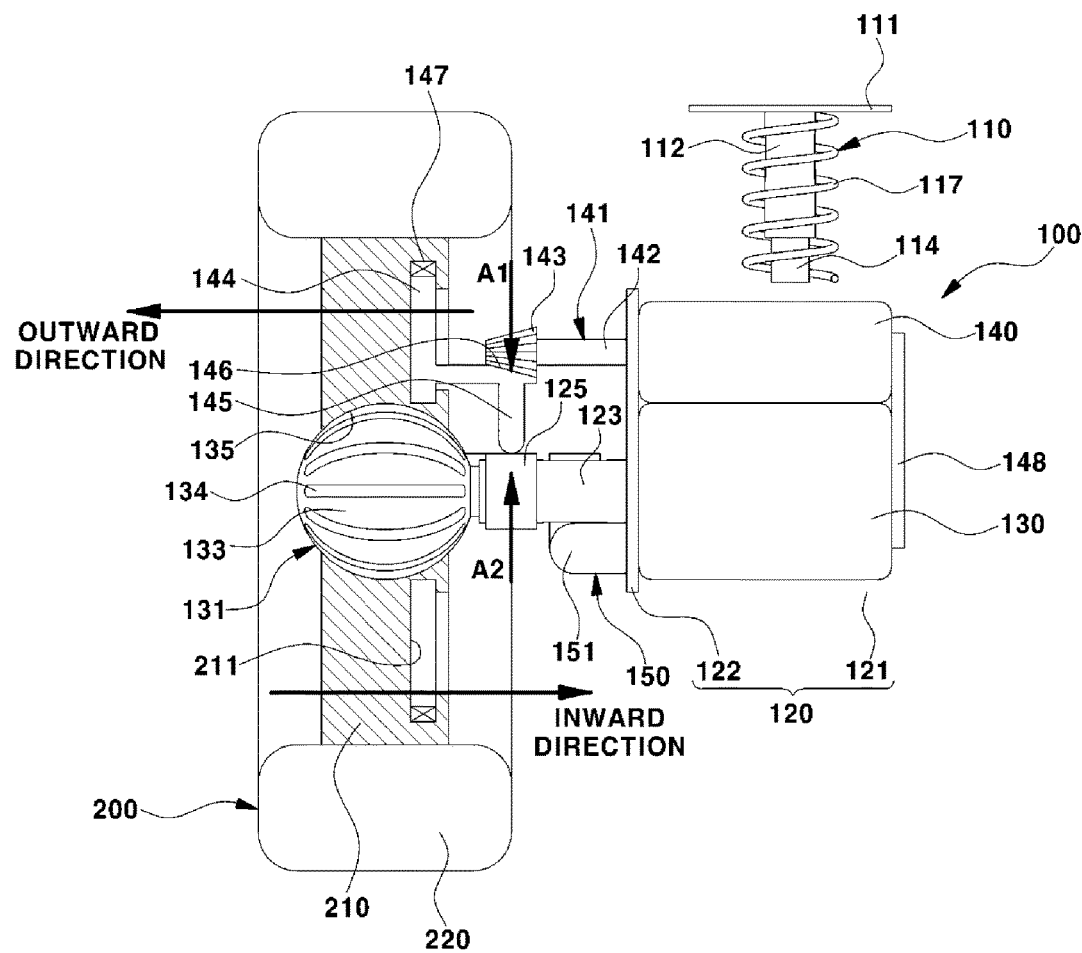

[FIG. 5A]
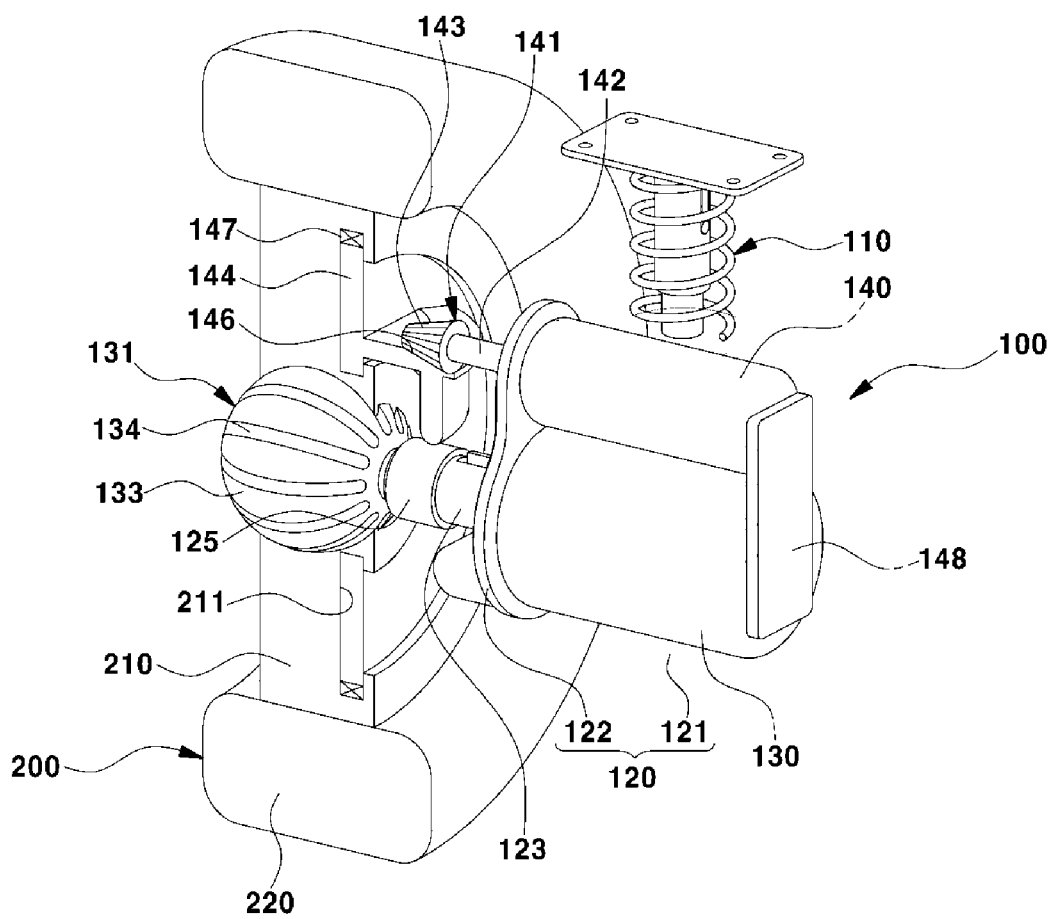

[FIG. 5B]
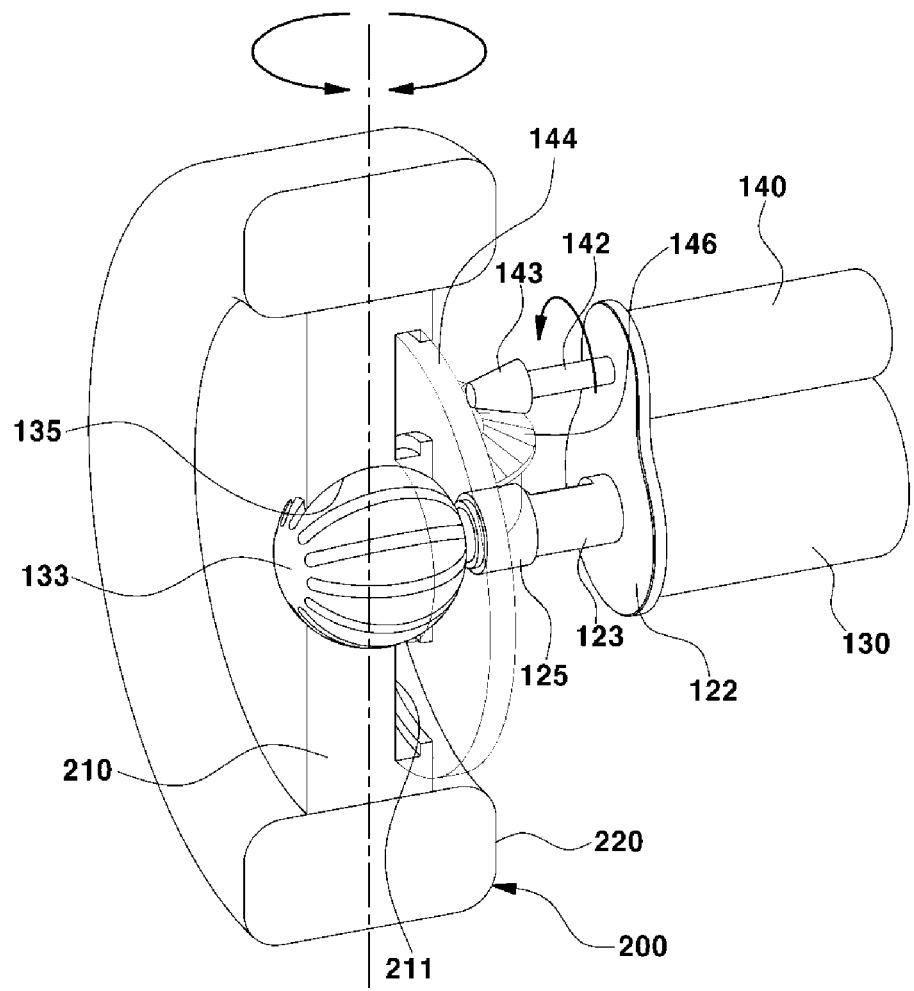

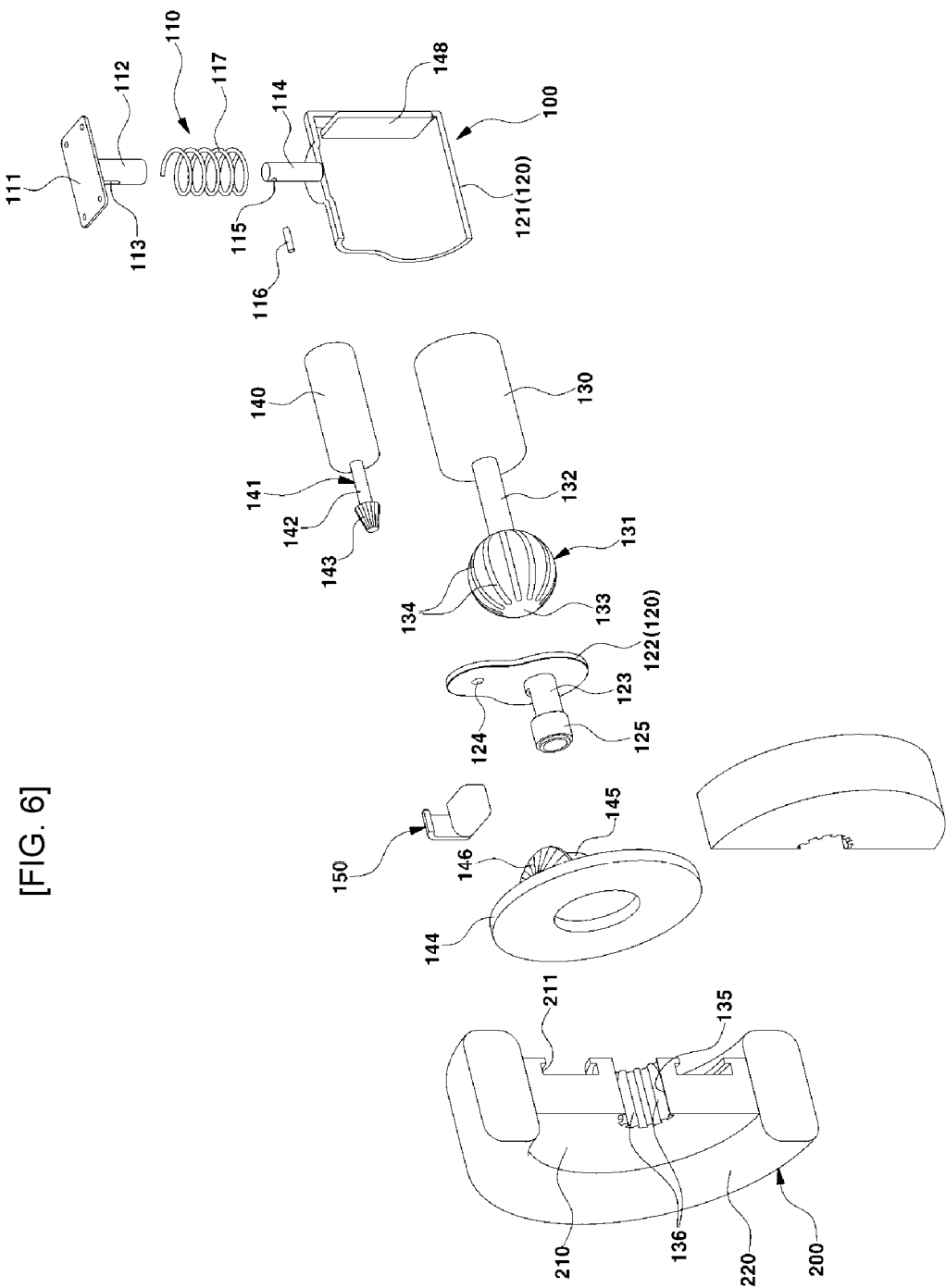
[FIG. 6]

[FIG. 7A]
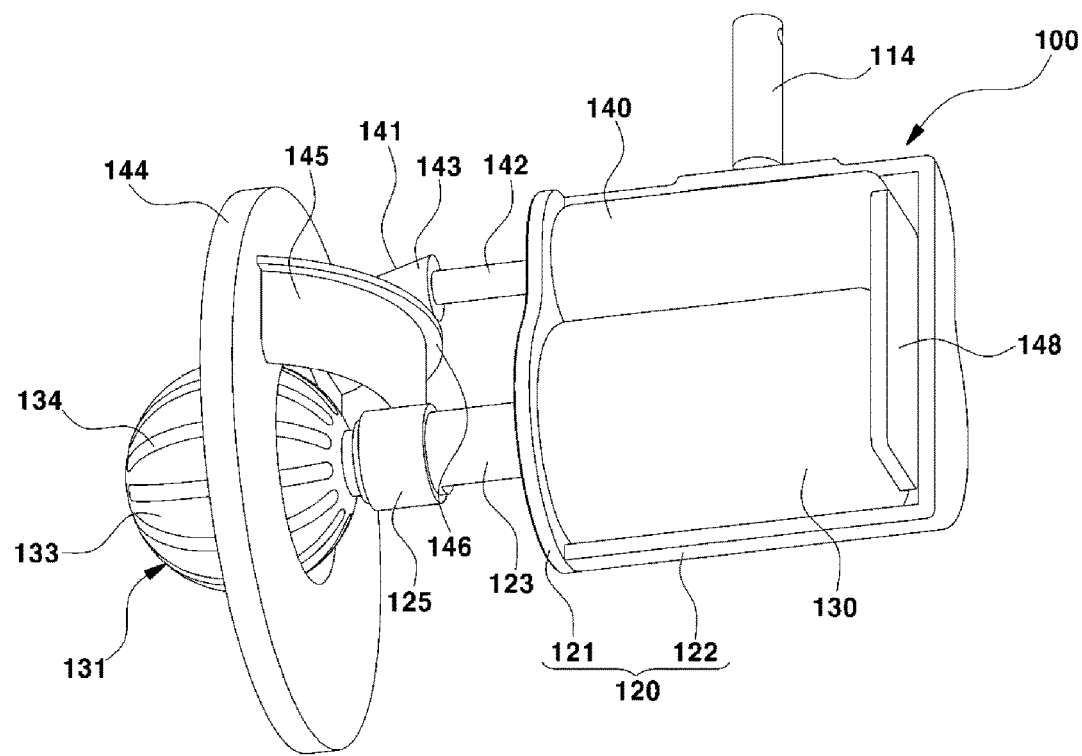

[FIG. 7B]
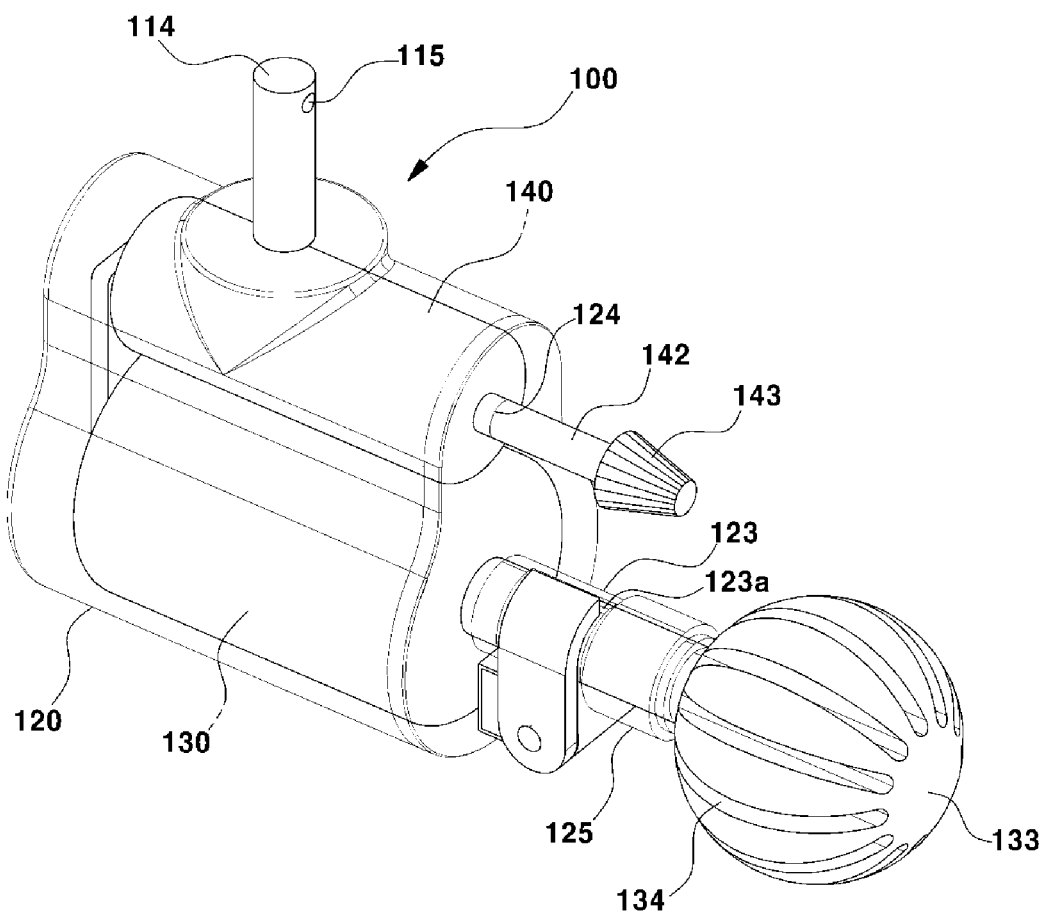

[FIG. 8]
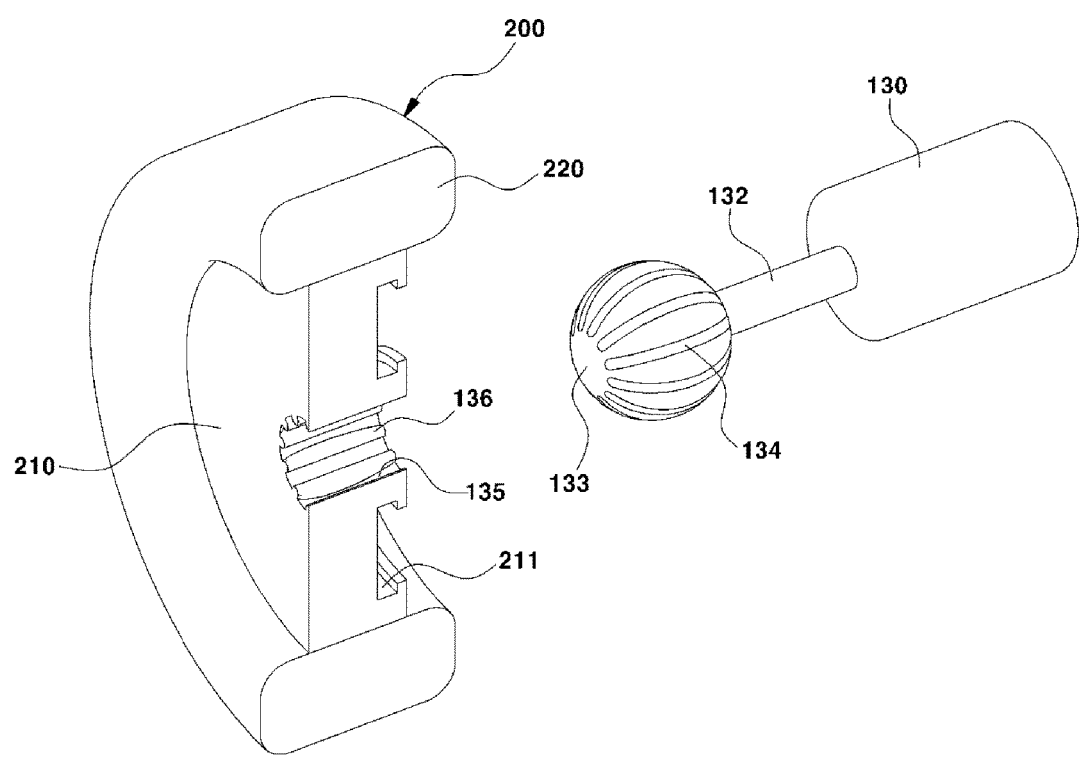

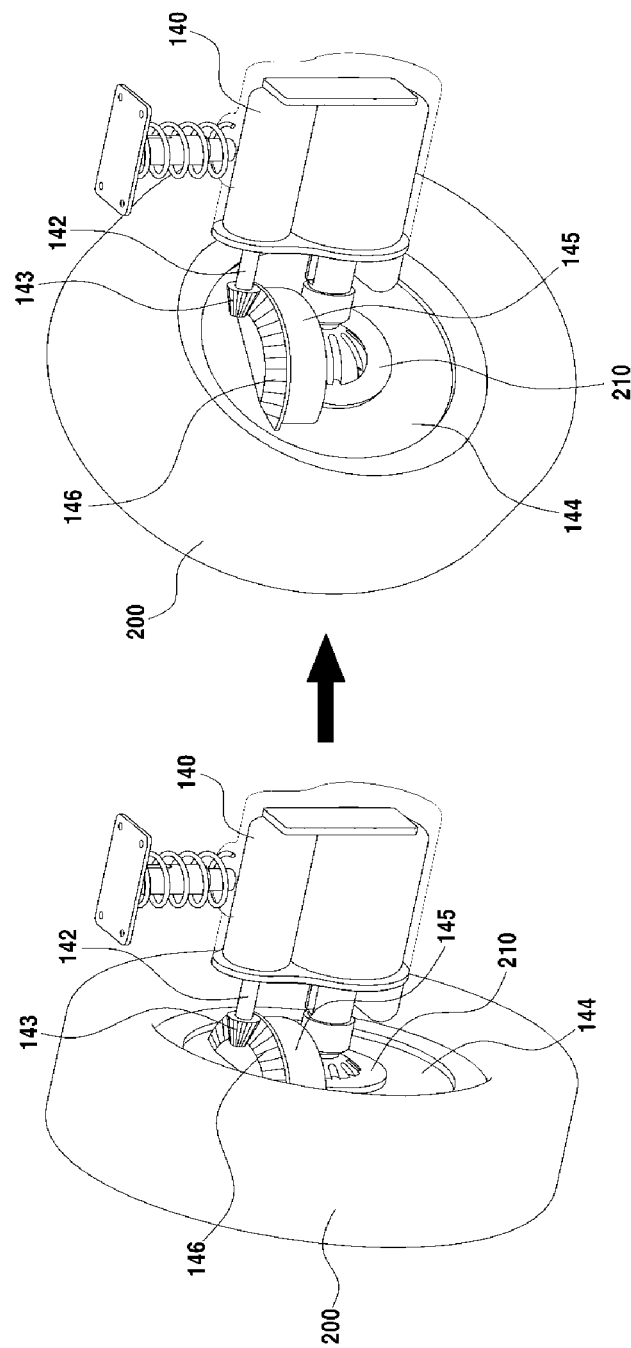

[FIG. 10]
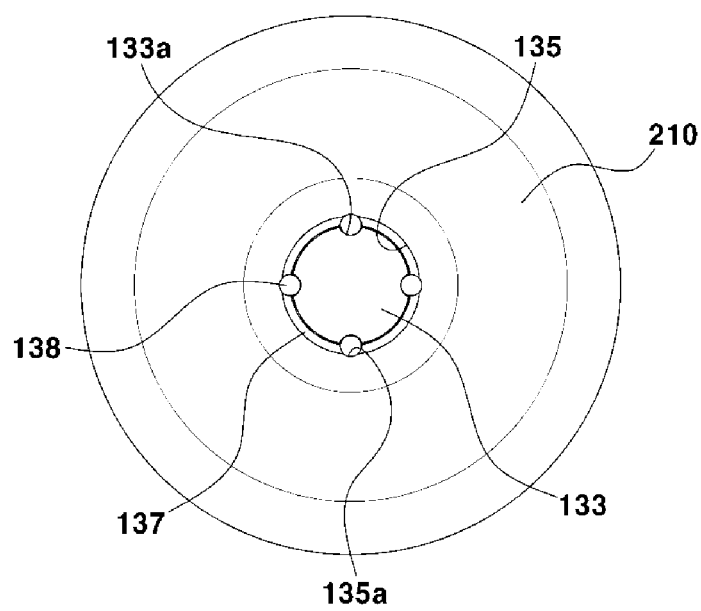

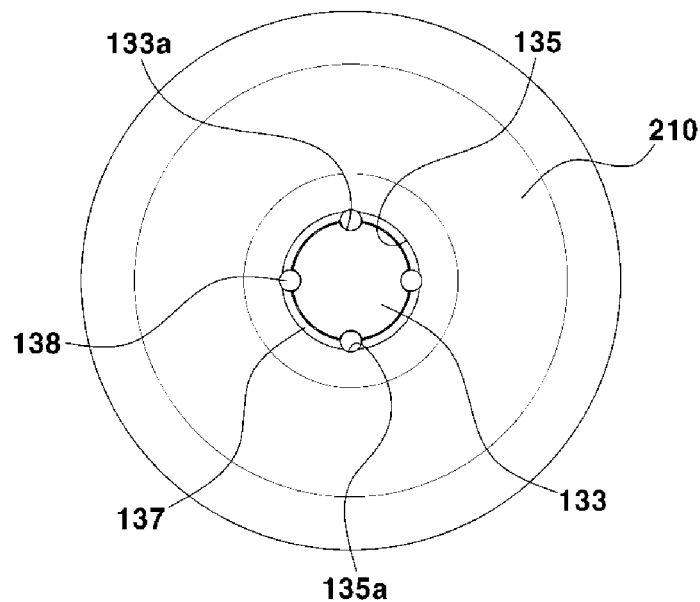
[FIG. 11]
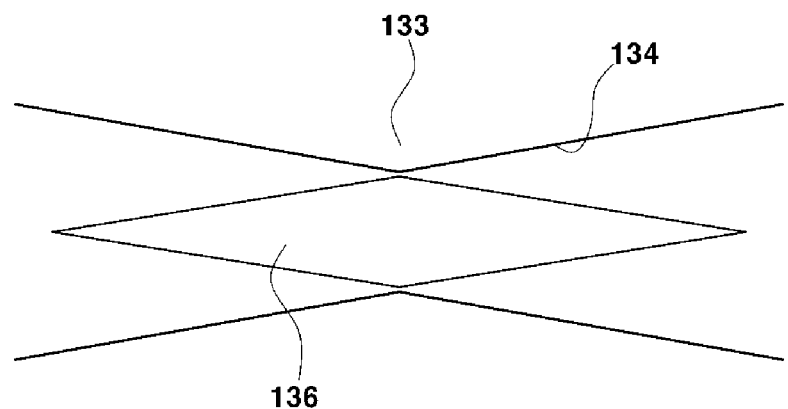

[FIG. 12A]
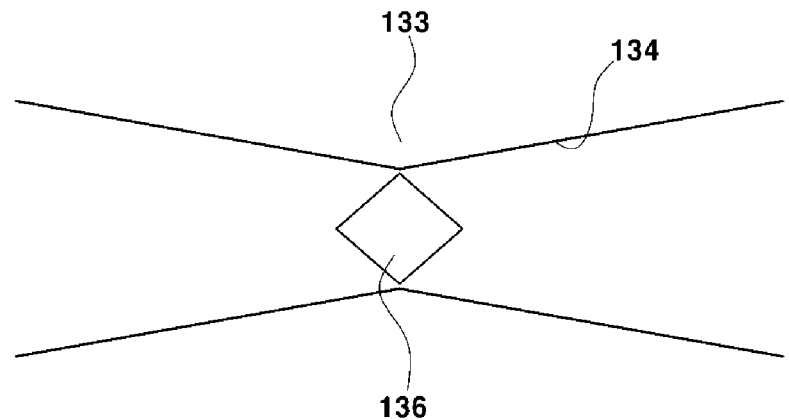
[FIG. 12B]
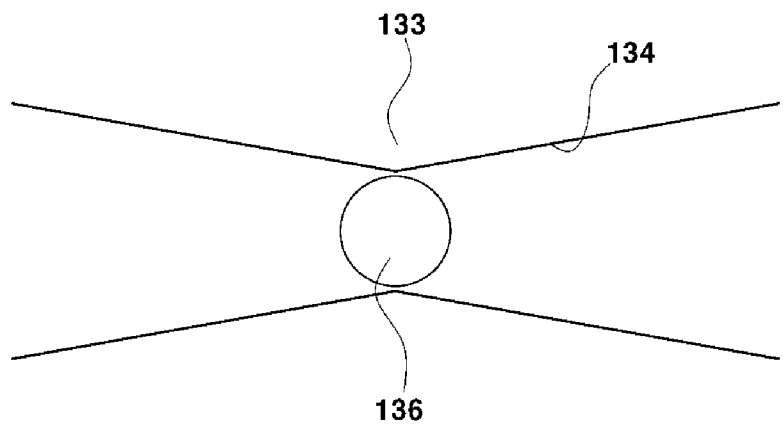
[FIG. 13]
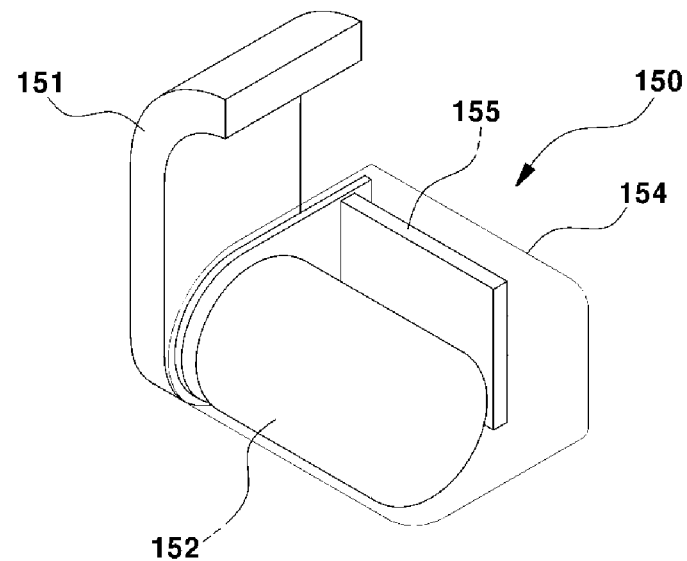

[FIG. 14]
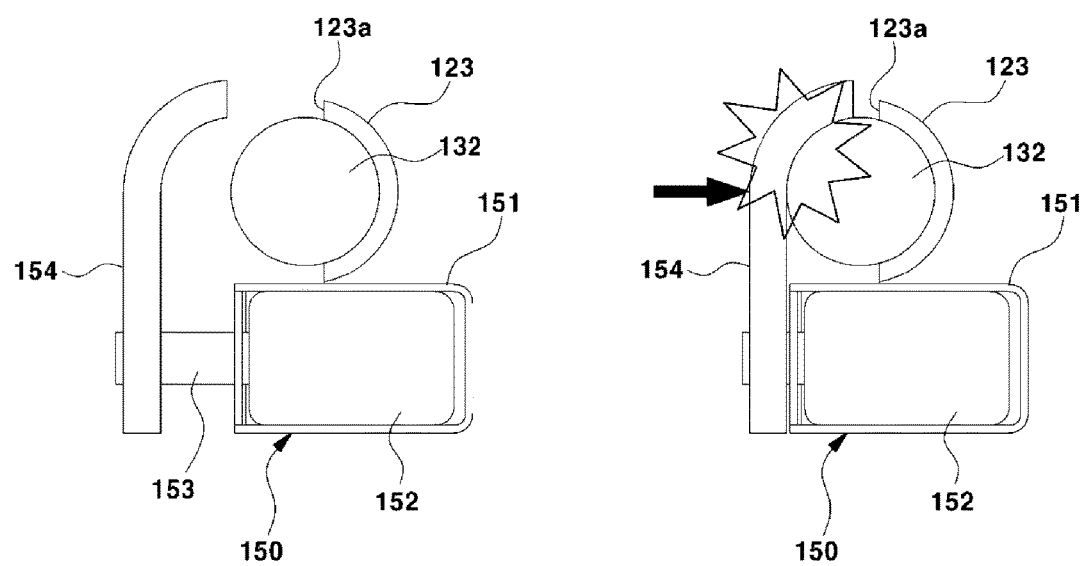

CORNER MODULE OF VEHICLE

CROSS-REFERENCE TO RELATED APPLICATION

This application claims the benefit of priority to Korean Patent Application No. 10-2020-0073331 filed on Jun. 17, 2020 in the Korean Intellectual Property Office, the entire contents of which are incorporated herein by reference.

TECHNICAL FIELD

The present disclosure relates to a corner module of a vehicle. More particularly, it relates to a corner module of a vehicle, which allows a wiring to be easily configured, allows durability of a motor and the wiring to be increased, allows an overall configuration to be simplified, and has a more compact form relative to a conventional form in terms of size and layout.

BACKGROUND

As it is known, an electronic corner module (e-corner module) is a module device for a vehicle, which is configured by integrating a driving device, a steering device, a braking device, and a suspension in the form of all parts combination. Unlike internal combustion engine vehicles, the e-corner module is a system which does not require complicated driving-related machinery such as engines and drive shafts and steering-related machinery such as gearboxes.

When an e-corner module is applied to a vehicle, the e-corner module becomes a driving device capable of independently steering a vehicle wheel so that there is an advantage in that responsiveness and driving stability of the vehicle wheel can be improved and energy can be saved.

In addition, when the e-corner module is applied to the vehicle, since each wheel can be independently driven, steered, and controlled in the vehicle, it is possible to significantly reduce a turning radius while the vehicle is turning.

In addition, as shown in FIG. 1, various vehicle behaviors such as a two-wheel turning, a four-wheel turning, an omni-directional movement (a diagonal driving), a zero radius turning, a 90° parking, and the like are possible.

The main core technologies in the known e-corner module are an in-wheel motor, an electronic brake, an electronic steering device, and an electronic damper (e-damper).

Here, an in-wheel motor system is a system which allows each wheel to be individually driven by installing an independent drive motor in each wheel of the vehicle. Since overall wheels can be individually controlled, stability is good when the vehicle corners and there is no wasted energy during a power transmission process from a drive motor to each wheel so that there is an advantage of significantly improving fuel efficiency.

The electronic brake is a friction braking device which generates a braking force with a force of a motor instead of a hydraulic pressure. The electronic brake can have excellent responsiveness of braking as well as, since a braking force can be distributed to front and rear wheels of the vehicle as necessary, increase driving stability.

The electronic steering device is configured to independently perform remote steering control with respect to each vehicle wheel on the basis of steering input information such as a steering angle and the like which is detected through a sensor when a driver operates a steering wheel.

In addition, a conventional e-damper is configured to be capable of absorbing a vertical vibration between the vehicle wheel and a vehicle body during driving and adjusting a height of the vehicle according to a driving situation.

Such an e-corner system allows a customized vehicle having various functions and designs which are desired by the user to be manufactured and produced, and all core functions influencing vehicle performance are included in each wheel. Thus, the e-corner system allows an arrangement of four wheels, for example, a full width (a left and right width of the vehicle) and a wheel base (an axle distance between a front wheel and a rear wheel) to be freely adjusted and allows a size of the vehicle to be freely determined.

Further, since traditional mechanical devices such as a powertrain and the like which were widely used in the existing vehicles are omitted, it is possible to provide a space in the vehicle so that a unique and elegant vehicle design which was not found in general vehicles can be implemented.

However, the conventional e-corner module has the following problems.

A configuration of a wiring of the in-wheel motor and the electronic brake is very difficult, and in particular, since the in-wheel motor is located in a wheel which rotates at a high speed, movement of the in-wheel motor and the wiring becomes larger so that there is a disadvantage in terms of durability.

For example, in a state in which the in-wheel motor is applied to an interior of a wheel being rotated, the in-wheel motor should receive power from the vehicle. However, owing to a high speed rotation and steering of the vehicle wheel, the movement occurs frequently so that there is a concern of disconnection in the wiring.

In addition, since a configuration of the electronic brake is very difficult and the wheel being rotated should be directly held, an electronic brake system with a large layout is required.

In addition, some e-corner module structures require large motors so as to drive in a stationary state when steering is performed by the aid of the rotation of the motor, and another e-corner module structure employs a steering gearbox and a steering motor which are similar to the existing steering gearbox and the existing steering motor so that there is a disadvantage in terms of layout.

The information included in this Background section is only for enhancement of understanding of the general background of the present disclosure and may not be taken as an acknowledgement or any form of suggestion that this information forms the prior art already known to a person skilled in the art.

SUMMARY OF THE DISCLOSURE

The present disclosure has been made in an effort to solve the above-described problems associated with prior art.

In one aspect, the present disclosure provides a corner module of a vehicle, which allows a wiring to be easily configured, allows durability of a motor and the wiring to be increased, allows an overall configuration to be simplified, and has a more compact form relative to a conventional form in terms of size and layout.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides a corner module of a vehicle, which includes: a suspension configured to be coupled to a vehicle body; a case configured to be coupled to the suspension and configured to be supported on the vehicle body via the suspension; an in-wheel motor disposed inside the case; a steering motor disposed inside the case; a first power transmission mechanism configured to connect the in-wheel motor and a vehicle wheel and configured to transmit a rotating force of the in-wheel motor to the vehicle wheel to drive the vehicle wheel; and a second power transmission mechanism configured to connect the steering motor and the vehicle wheel and configured to transmit a rotating force of the steering motor to the vehicle wheel to steer the vehicle wheel.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a diagram illustrating various movements of a vehicle to which a known e-corner module is applied;

FIG. 2 is a combined perspective view illustrating a corner module and a vehicle wheel according to an embodiment of the present disclosure;

FIG. 3 is a diagram illustrating an inward configuration of the vehicle wheel, such as a suspension and the like, in a state in which the corner module is coupled to the vehicle wheel according to an embodiment of the present disclosure;

FIG. 4 is a cross-sectional view illustrating a state in which the corner module is coupled to the vehicle wheel according to an embodiment of the present disclosure;

FIGS. 5A and 5B are cross-sectional perspective views illustrating the state in which the corner module is coupled to the vehicle wheel according to the embodiment of the present disclosure;

FIG. 6 is an exploded perspective view illustrating the corner module according to the embodiment of the present disclosure;

FIGS. 7A and 7B are assembly perspective views illustrating the corner module according to the embodiment of the present disclosure;

FIG. 8 is a diagram illustrating the in-wheel motor and a first power transmission mechanism of the corner module, and the vehicle wheel according to the embodiment of the present disclosure;

FIG. 9 is a diagram illustrating a state in which steering of the vehicle wheel is performed by the corner module according to the embodiment of the present disclosure;

FIGS. 10 to 12A and B are diagrams illustrating another example of a coupling structure between a joint ball and a wheel in an embodiment of the present disclosure;

FIG. 13 is a perspective view illustrating an electronic brake in the corner module according to the embodiment of the present disclosure; and FIG. 14 is a diagram illustrating an operating state of the electronic brake in the corner module according to the embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure will be fully described in a detail which is suitable for implementation by those skilled in the art to which the present disclosure pertains with reference to the accompanying drawings. However, the present disclosure is not limited to the embodiments disclosed herein and may be implemented in other forms.

Throughout this specification, when an element is referred to as "comprising" a component, it means that the element can further include other components, not excluding the other components unless specifically stated otherwise.

The present disclosure relates to a chassis corner module which is individually mounted on each vehicle wheel of a vehicle and relates to an electronic corner module (e-corner module) configured by integrating an in-wheel motor, an electronic steering device, an electronic brake, and a suspension in the form of all parts combination.

The e-corner module according to the present disclosure is separately mounted on each vehicle wheel of the vehicle and provided to be independently driven and controlled. The in-wheel motor is used as a driving device for driving the vehicle, motors are employed in the electronic steering device and the electronic brake, and driving of each of the motors is controlled according to a control signal of a controller.

The present disclosure provides the e-corner module which allows a wiring to be easily configured, allows durability of the motor and the wiring to be increased, allows an overall configuration to be simplified, and has a more compact form relative to a conventional form in terms of size and layout. Configurations of embodiments for the e-corner module will be described as follows.

FIG. 2 is a combined perspective view illustrating a corner module and a vehicle wheel according to an embodiment of the present disclosure, FIG. 3 is a diagram illustrating an inward configuration of the vehicle wheel, such as a suspension and the like, in a state in which the corner module is coupled to the vehicle wheel according to an embodiment of the present disclosure, and FIG. 4 is a cross-sectional view illustrating a state in which the corner module is coupled to the vehicle wheel according to an embodiment of the present disclosure.

In addition, FIGS. 5A and 5B are cross-sectional perspective views illustrating the state in which the corner module is coupled to the vehicle wheel according to the embodiment of the present disclosure, FIG. 6 is an exploded perspective view illustrating the corner module according to the embodiment of the present disclosure, and FIGS. 7A and 7B are assembly perspective views illustrating the corner module according to the embodiment of the present disclosure.

A corner module 100 according to an embodiment of the present disclosure is coupled to a vehicle wheel 200, and the vehicle wheel 200 includes a wheel 210 and a tire 220.

The corner module 100 according to the embodiment of the present disclosure is individually configured for each vehicle wheel 200 of the vehicle, each vehicle wheel 200 of the vehicle may have the corner module 100 having the same configuration, and the corner module 100 for each vehicle wheel 200 may be provided to be operated and controlled independently.

The corner module 100 according to the embodiment of the present disclosure includes a suspension 110 coupled to a vehicle body (not shown), a case 120 coupled to the suspension 110 and installed to be supported on the vehicle body via the suspension 110, an in-wheel motor 130 and a steering motor 140 which are installed inside the case 120, a first power transmission mechanism 131 installed to connect between the in-wheel motor 130 and the vehicle wheel 200 and configured to transmit a rotating force of the in-wheel motor 130 to the vehicle wheel 200 to allow the vehicle wheel 200 to be driven, and a second power transmission mechanism 141 installed to connect between the steering motor 140 and the vehicle wheel 200 to transmit a rotating force of the steering motor 140 to the vehicle wheel 200 to allow the vehicle wheel 200 to be steered.

In addition, the corner module 100 according to the embodiment of the present disclosure may further include an electronic brake 150 mounted on the case 120 and configured to apply a frictional braking force to a rotating shaft 132 of the in-wheel motor 130.

In the present disclosure, a driving device including the in-wheel motor 130, a steering device including the steering motor 140, and the electronic brake 150 may each be controlled by a corresponding controller. For example, cooperative control of a vehicle controller which is a higher level controller, a motor controller for controlling driving of the in-wheel motor 130, a steering controller for controlling an operation of the steering motor 140, and a brake controller for controlling an operation of the electronic brake 150 may be performed.

As described above, the devices constituting the e-corner module 100 may be controlled by a plurality of controllers, and alternatively, may be controlled by a single integrated control component. Hereinafter, in describing a configuration of the present disclosure, the above-described plurality of controllers and the single integrated control component will be collectively referred to as a controller.

In the corner module 100 according to the embodiment of the present disclosure, the in-wheel motor 130 for driving the vehicle and the first power transmission mechanism 131 for transmitting the rotating force of the in-wheel motor 130 to the vehicle wheel 200 constitute an electronic drive device for independently rotating and driving a corresponding vehicle wheel 200.

In addition, in the corner module 100 according to the embodiment of the present disclosure, the steering motor 140 for steering the vehicle wheel 200 and the second power transmission mechanism 141 for transmitting the rotating force of the steering motor 140 to the vehicle wheel 200 constitute an electronic steering device for independently rotating and steering a corresponding vehicle wheel 200.

Here, as shown in each drawing, the vehicle wheel 200 includes the wheel 210 and the tire 220 coupled to the wheel 210.

As shown in FIGS. 3 and 6, the suspension 110 may include a vehicle body fixing part 111 which is integrally coupled to the vehicle body and in which a fixing shaft 112 is formed, a case connecting shaft 114 integrally formed in the case 120 and slidably coupled to the fixing shaft 112 of the vehicle body fixing part 111, and a spring 117 interposed between the vehicle body fixing part 111 and the case 120 and mounted to be disposed at an outer side of the fixing shaft 112 and the case connecting shaft 114.

The fixing shaft 112 of the vehicle body fixing part 111 and the case connecting shaft 114 are shafts which are vertically disposed to be long, and the case connecting shaft 114 may be inserted into and coupled to the fixing shaft 112 of the vehicle body fixing part 111.

In this case, a slot hole 113 having a shape extending to be long in an axial direction is formed in the fixing shaft 112, and a pinhole 115 of FIG. 6 is formed in the case connecting shaft 114 such that a separation prevention pin 116 of FIG. 6 is inserted into and coupled to the pinhole 115.

Thus, when the separation prevention pin 116 is coupled to the slot hole 113 and the pinhole 115 by being inserted into the slot hole 113 and the pinhole 115 to pass therethrough in a state in which the case connecting shaft 114 is inserted into the fixing shaft 112 of the vehicle body fixing part 111, the case connecting shaft 114 disposed coaxially with respect to the fixing shaft 112 of the vehicle body fixing part 111 becomes a state of sliding vertically.

Here, when the fixing shaft 112 and the case connecting shaft 114 slide, the separation prevention pin 116 is vertically moved along the slot hole 113 in a state of being inserted into the pinhole 115.

Consequently, in a state in which the vehicle body fixing part 111 is fixed to the vehicle body, the case connecting shaft 114 may be vertically moved by as much as a length section of the slot hole 113, in which the separation prevention pin 116 may be moved with respect to the fixing shaft 112.

As described above, the fixing shaft 112 of the vehicle body fixing part 111 and the case connecting shaft 114 formed in the case 120 slide mutually so that a vibration between the vehicle body and the vehicle wheel 200 may be absorbed by the spring 117.

Both end portions of the separation prevention pin 116 may be riveted so as to not be pulled out from the slot hole 113 and pinhole 115, or separate engagement objects (not shown) for preventing disconnection and separation from the slot hole 113 and pinhole 115 may be coupled to the both end portions.

The case 120 is provided to have an inner space of a predetermined volume, and as shown in FIG. 6, the in-wheel motor 130 and the steering motor 140 are accommodated and fixed inside the case 120.

The case 120 includes a case main body 121 having one opened side, and a case cover 122 coupled to an opening of the case main body 121 to seal an interior thereof. The case connecting shaft 114 is installed to extend upward in an upper surface portion of the case main body 121.

That is, the upper surface portion of the case main body 121 becomes a portion connected to the suspension 110.

In addition, a printed circuit board (PCB) 148, in which an electrical circuit for driving the in-wheel motor 130 and the steering motor 140 is configured, may be installed together inside the case 120. An electrical circuit, such as an inverter and the like, for driving and controlling the in-wheel motor 130 and the steering motor 140 may be provided in the PCB 148.

The driving of the in-wheel motor 130 and the steering motor 140 is controlled according to a control signal of a controller in the vehicle. To this end, when the control signal output from the controller in the vehicle is applied to the electrical circuit of the PCB 148, each of the in-wheel motor 130 and the steering motor 140 may be driven by the electrical circuit (a motor driving circuit including an inverter circuit) of the PCB 148. In the present disclosure, the controller may be a processor such as a CPU or an electronic control unit (ECU) for controlling one or more of the electrical systems or subsystems in a vehicle.

The PCB 148 may be a part or an entirety of components of the controller for driving and controlling the in-wheel motor 130 and the steering motor 140.

Referring to FIG. 6, it can be seen that the in-wheel motor 130 and the steering motor 140 are inserted and installed in the case main body 121. In this case, although not shown in the drawing, since the in-wheel motor 130 and the steering motor 140 should be mounted to be stably fixed on an inner surface of the case main body 121, a bracket or the like may be used.

A bracket or the like is provided to fix and mount the in-wheel motor 130 and the steering motor 140 on the inner surface of the case main body 121. The bracket may be located and fixed on the inner surface of the case main body 121 by an engagement method such as bolting, riveting, welding, or the like. Even in fixing the in-wheel motor 130 and the steering motor 140 to the bracket, bolting, riveting, welding, or other engagement methods may be employed.

The case cover 122 is applicable as long as it has a shape which is capable of being coupled to seal the opening of the case main body 121. For example, as shown in FIG. 6, the case cover 122 may be provided in a plate shape, and a passage 123 and a hole 124 in FIG. 6 through which the first power transmission mechanism 131 and the second power transmission mechanism 141 are capable of passing are formed at one side and the other side of the case cover 122.

To describe in detail, the passage 123 of a tube shape through which a rotating shaft 132 in FIG. 6 of the in-wheel motor 130 is capable of passing is integrally installed at one side of the case cover 122, and the hole 124 through which a rotating shaft 142 of the steering motor 140 is capable of passing is formed at the other side of the case cover 122.

In the in-wheel motor 130, the rotating shaft 132 is integrally coupled to a rotor of the in-wheel motor 130. A joint ball 133 coupled to the wheel 210 of the vehicle wheel 200 is integrally formed at a distal end portion of the rotating shaft 132 and inserted into and coupled to a ball housing 135 formed in the wheel 210 of the vehicle wheel 200.

The joint ball 133 and the ball housing 135 constitute a type of a coupling structure in the form of a ball joint. Unlike the conventional ball joint, the joint ball 133 and the ball housing 135 in the present disclosure are components for transmitting a rotating force.

That is, the rotating force of the joint ball 133 is transmitted to the wheel 210 of the vehicle wheel 200 through the ball housing 135 so that all of the rotating shaft 132 of the in-wheel motor 130, the joint ball 133, the ball housing 135, the wheel 210, and the tire 220 are integrally rotated.

The joint ball 133 and the ball housing 135 are force transmission components for transmitting the rotating force of the in-wheel motor 130 transmitted through the rotating shaft 132 to the wheel 210 of the vehicle wheel 200 in which the ball housing 135 is formed.

Thus, in an embodiment of the present disclosure, the rotating shaft 132 and the joint ball 133 of the in-wheel motor 130 and the ball housing 135 formed in the wheel 210 of the vehicle wheel 200 and coupled to the joint ball 133 constitute the first power transmission mechanism 131. Owing to the first power transmission mechanism 131, the rotating force of the in-wheel motor 130 is transmitted to the wheel 210 of the vehicle wheel 200, and the vehicle wheel 200 is rotated to be rolled and moved on a road surface.

In an embodiment of the present disclosure, the joint ball 133 may be formed in a spherical shape, and the ball housing 135 is configured such that a hole in which the joint ball 133 is accommodatable is formed in the wheel 210 of the vehicle wheel 200.

As described above, the ball housing 135 is configured such that a spherical empty space in which the joint ball 133 is insertable, accommodatable, and couplable to the wheel 210 of the vehicle wheel 200 is provided. This becomes a configuration which includes the hole formed in the wheel 210 of the vehicle wheel 200 so as to allow the joint ball 133 to be insertable and couplable.

In addition, as described above, the joint ball 133 and the ball housing 135 should be coupled to be capable of mutually transmitting rotating forces. Through such a coupling, when the in-wheel motor 130 is driven, the joint ball 133 and the ball housing 135 should be integrally rotated due to the rotating force of the in-wheel motor 130.

In order to allow all of the joint ball 133 and the ball housing 135 and further the rotating shaft 132 of the in-wheel motor 130, the joint ball 133, the ball housing 135, and the wheel 210 of the vehicle wheel 200 to constitute a coupling structure capable of transmitting a rotating force and constitute a coupling structure capable of being integrally rotated, a plurality of thin elongated grooves 134 having a predetermined width and a predetermined length are formed on a surface of the joint ball 133, and a plurality of protrusions 136 which are insertable into the plurality of grooves 134 of the joint ball 133 are formed on an inner surface of the ball housing 135 of the wheel 210.

In this case, each of the plurality of protrusions 136 may have a thin elongated shape having a predetermined width and a predetermined length.

In addition, the plurality of grooves 134 may be formed in the joint ball 133 to be disposed at predetermined intervals in a circumferential direction based on the rotating shaft 132 of the in-wheel motor 130, and each of the plurality of grooves 134 may be formed to be long on the surface of the joint ball 133 in a front-rear direction.

In addition, the plurality of protrusions 136 may be formed to be disposed on the inner surface of the ball housing 135 at predetermined intervals in the circumferential direction to be insertable into the plurality of grooves 134 of the joint ball 133. In this case, each of the plurality of protrusions 136 may also be formed to be long on the inner surface of the ball housing 135 in the front-rear direction.

Thus, the rotating force may be transmitted between the joint ball 133 and the ball housing 135 due to a coupling structure in which each protrusion 136 is inserted into each groove 134. Consequently, since the rotating force of the in-wheel motor 130 may be transmitted to the wheel 210 of the vehicle wheel 200 through the rotating shaft 132, the joint ball 133, and the ball housing 135, when the in-wheel motor 130 is driven to be rotated, the vehicle wheel 200 receiving the rotating force of the in-wheel motor 130 may be rotated together therewith and rolled and moved on a road surface.

The rotating shaft 142 of the steering motor 140 is coupled to pass through the hole 124 of the case cover 122. In this case, a first gear 143 for transmitting the rotating force of the steering motor 140 is integrally mounted in a front end portion of the rotating shaft 142 of the steering motor 140.

In addition, a steering wheel 144 is installed in the wheel 210 of the vehicle wheel 200. A circular plate accommodation groove 211 into which the steering plate 144 is insertable is formed on an inner surface of the wheel 210 of the vehicle wheel 200, and the steering plate 144 is inserted into the circular plate accommodation groove 211 so that the wheel 210 of the vehicle wheel 200 and the steering plate 144 are coupled.

When the wheel 210 of the vehicle wheel 200 is rotated by receiving the rotating force of the in-wheel motor 130 through the first power transmission mechanism 131, the steering plate 144 is not rotated and only the wheel 210 of the vehicle wheel 200 is rotated. To this end, a first bearing 147 is installed between the steering plate 144 and the wheel 210 of the vehicle wheel 200.

For example, the first bearing 147 may be installed along an edge of the steering plate 144 and an inner portion of the plate accommodation groove 211 facing the edge. Thus, when the wheel 210 and an entirety of the vehicle wheel 200 receive the rotating force of the in-wheel motor 130 and are rotated to be rolled and moved on a road surface, the steering plate 144 may be maintained in a fixed state without being rotated.

However, when the steering motor 140 is driven to be rotated and thus the rotating force of the steering motor 140 is transmitted to the steering plate 144, the steering plate 144 is rotated in a direction in which steering is integrally performed with the wheel 210 of the vehicle wheel 200.

To this end, a second gear 146 engaged with the first gear 143 is formed on one side surface of the steering plate 144, and the first gear 143 and the second gear 146 constitute a mechanism in the form of a bevel gear.

Gear teeth are formed in each of the first gear 143 and the second gear 146 such that the two gears are engaged to be couplable to each other to allow power transmission.

The second gear 146 may be formed in a shape protruding from an inner surface of the steering plate 144. A central rotation axis of the second gear 146 is coaxial with a central rotation axis of the steering plate 144 which is rotated with the vehicle wheel 200 when the vehicle wheel 200 is steered.

As shown in FIGS. 2 and 7A, a protrusion 145 having a predetermined height and a substantially semi-circular shape or a substantially arc shape is formed on the inner surface of the steering plate 144, and the second gear 146 is integrally provided on an upper surface of the protrusion 145.

A central rotation axis of the first gear 143 is the rotating shaft 142 of the steering motor 140, and the central rotation axis of the second gear 146 becomes a steering axis which becomes a center of rotation of the vehicle wheel 200 when the vehicle wheel 200 is rotated for steering and alignment. Thus, the central rotation axis of the second gear 146 corresponds to a kingpin axis in a conventional steering device.

In an embodiment of the present disclosure, the central rotation axis of the first gear 143 is set to intersect the central rotation axis of the second gear 146 formed in the steering plate 144. Therefore, the first gear 143 and the second gear 146 which constitute the bevel gear mechanism may transmit a rotating force between two intersecting axes.

Here, the central rotation axis of the first gear 143 may be set to intersect perpendicular to the central rotation axis of the second gear 146 (that is, the central rotation axis of the steering plate 144 during steering).

FIG. 9 is a diagram illustrating a state in which steering of the vehicle wheel 200 is performed by the corner module 100 according to the embodiment of the present disclosure.

As shown in FIGS. 5B and 9, the rotating force of the steering motor 140 may be transmitted to the steering plate 144 through the first gear 143 and the second gear 146. In this case, since the steering plate 144 is rotated about the central rotation axis of the steering motor 140 due to the rotating force of the steering motor 140, an entirety of the vehicle wheel 200 including the wheel 210 and the tire 220 is rotated together with the steering plate 144 about the steering axis so that steering of the vehicle wheel 200 is performed.

As described above, the rotating force of the steering motor 140 is used as a force for rotating the vehicle wheel 200 about the steering axis for steering.

In this case, the second power transmission mechanism 141 is a mechanism for transmitting the rotating force of the steering motor 140 to the vehicle wheel 200 for steering and may include the rotating shaft 142 of the steering motor 140, the first gear 143 mounted in the rotating shaft 142 of the steering motor 140, the steering plate 144 coupled to the vehicle wheel 200, and the second gear 146 provided on the steering plate 144 and engaged with the first gear 143.

In an embodiment of the present disclosure, the vehicle wheel 200 including the wheel 210 and the tire 220 receives the rotating force of the in-wheel motor 130 through the first power transmission mechanism 131 and is rotated to be rolled and moved on a road surface. In this case, unlike that the wheel 210 is rotated due to power of the in-wheel motor 130, the steering plate 144 is not rotated due to the power of the in-wheel motor 130.

Since the first bearing 147 is interposed between the wheel 210 of the vehicle wheel 200 and the steering plate 144, when the vehicle wheel 200 is driven to be rotated by the in-wheel motor 130, the steering plate 144 connected to the steering motor 140 via the first gear 143 and the second gear 146 is not integrally rotated with the vehicle wheel 200. However, when the rotating force of the steering motor 140 is transmitted, the steering plate 144 is rotated about the above described steering axis so that steering of the vehicle wheel 200 is performed.

As described above, when the steering plate 144 is rotated about the steering axis by the steering motor 140, the wheel 210 coupled to the steering plate 144 is also rotated about the steering axis together with the steering plate 144. Consequently, the entirety of the vehicle wheel 200 including the wheel 210 is rotated about the steering axis so that the steering of the vehicle wheel 200 is performed.

As described above, the steering plate 144 and the wheel 210 are rotated about the steering axis due to the rotating force of the steering motor 140, which is transmitted through the second power transmission mechanism 141, so that the steering of the vehicle wheel 200 is performed. At this time, the wheel 210 of the vehicle wheel 200 is rotated due to the rotating force of the in-wheel motor 130 transmitted through the first power transmission mechanism 131, as well as rotated about the steering axis due to the rotating force of the steering motor 140 transmitted through the second power transmission mechanism 141.

However, since the steering plate 144 transmits only the rotating force of the steering motor 140, which is transmitted through the second power transmission mechanism 141, to the wheel 210 of the vehicle wheel 200, even when the wheel 210 of the vehicle wheel 200 is rotated due to the rotating force of the in-wheel motor 130 transmitted through the first power transmission mechanism 131, the steering plate 144 is not rotated due to the rotating force of the in-wheel motor 130.

When the vehicle wheel 200 is rotated due to the rotating force of the in-wheel motor 130 and the central rotation axis of the vehicle wheel 200 becomes the driving shaft 153, the steering plate 144 may be always rotated with the wheel 210 and the vehicle wheel 200 about the steering axis. However, the steering plate 144 is not rotated about the driving shaft 153, and an engagement state between the first gear 143 and the second gear 146 and a power transmission possible state of the steering motor 140 and the steering plate 144 may be consistently maintained.

In an embodiment of the present disclosure, a second bearing 125 is installed in the passage 123 of the case cover 122, and as shown in FIG. 4, the second bearing 125 supports the protrusion 145 of the steering plate 144 from a lower side of the protrusion 145.

Consequently, as it can be seen from FIG. 4, in a state in which the first gear 143 is engaged with the second gear 146 above the protrusion 145, the rotating shaft 142 of the steering motor 140 pushes down the protrusion 145 of the steering plate 144 through the first gear 143 (in a direction of an arrow "A1" in FIG. 4) so that the wheel 210 may be prevented from being inclined in an outward direction.

In addition, the second bearing 125 installed in the passage 123 of the case cover 122 may support the protrusion 145 of the steering plate 144 upward from the lower side (in a direction of an arrow "A2" in FIG. 4) to prevent the wheel 210 from being inclined inward.

The second bearing 125 may be installed to serve to support the rotating shaft 132 of the in-wheel motor 130 passing through an interior of the passage 123 of the case cover 122. For example, an inner ring of the second bearing 125 may integrally fixed to the rotating shaft 132 of the in-wheel motor 130, an outer ring of the second bearing 125 may be integrally fixed to the passage 123, and a plurality of balls may be interposed between the inner ring and the outer ring.

In this case, in a state in which the protrusion 145 of the steering plate 144 is put on the outer ring of the second bearing 125, a structure is configured such that the outer ring of the second bearing 125 supports the protrusion 145 of the steering plate 144 from a lower side of the protrusion 145.

Referring to FIG. 7B, it can be seen that the steering motor 140, the in-wheel motor 130, and the PCB 148 for driving and controlling the two motors 130 and 140 are accommodated together inside one case 120, and the steering motor 140 is located above the in-wheel motor 130.

In addition, referring to FIG. 7B, it can be seen that the rotating shaft 132 of the in-wheel motor 130 passes through the interior of the passage 123 of the case 120, and the joint ball 133 on which the thin elongated grooves 134 are formed is integrally mounted at the distal end portion of the rotating shaft 132 of the in-wheel motor 130.

In addition, referring to FIG. 7B, it can be seen that the rotating shaft 142 of the steering motor 140 passes through the hole 124 of the case 120, and the first gear 143 constituting the bevel gear mechanism is mounted on the rotating shaft 142 of the steering motor 140.

In addition, referring to FIG. 7B, it can be seen that the electronic brake 150 is mounted on the rotating shaft 132 of the in-wheel motor 130, which is a shaft for driving the vehicle wheel 200.

FIGS. 10 to 12 are diagrams illustrating another example of a coupling structure between a joint ball and a wheel in an embodiment of the present disclosure.

As described above, the example of FIG. 8 is an example in which the long slit-shaped grooves 134 are formed in the joint ball 133, and the thin elongated protrusions 136 are formed on the inner surface of the ball housing 135 of the wheel 210, but is merely illustrative and the present disclosure is not limited thereto. The coupling structure between the joint ball 133 and the wheel 210 may be variously modified.

For example, as shown in FIG. 10, a ball bearing for power transmission may be interposed between the joint ball 133 and the ball housing 135 of the wheel 210.

Here, the ball bearing may include a cage 137 and a plurality of balls 138 coupled to the cage 137. The cage 137 serves to prevent separation of the balls 138 while maintaining a gap between the balls 138.

In this case, a plurality of grooves 133*a* and 135*a* into which the balls 138 of the ball bearing are insertable are formed on the surface of the joint ball 133 and the inner surface of the ball housing 135.

As described above, when the ball bearing is applied, a large frictional force may be generated between the ball bearing, the joint ball 133, and the ball housing 135 due to a load of the vehicle. Thus, the rotating force of the in-wheel motor 130 may be transmitted the wheel 210to drive the wheel 210, and during steering, the wheel 210 may be smoothly rotated about the steering axis such that a structure which is advantageous for steering is achieved.

In addition, as illustrated in FIGS. 11 and 12, a shape of the groove 134 formed on the surface of the joint ball 133 and a shape of the protrusion 136 formed on the inner surface of the ball housing 135 may be variously modified.

That is, as in an example of FIG. 11, the protrusion 136 of the ball housing 135 may be formed in a thin elongated shape. In this case, the protrusion 136 may have a shape of which a width is largest in an intermediate portion in a length direction and is gradually decreased toward both end portions of the protrusion 136.

In this case, the groove 134 of the joint ball 133 may have a shape of which a width is small in an intermediate portion in a length direction and is gradually increased toward both end portions of the groove 134. Thus, force for driving the wheel 210.

Alternatively, as shown in FIG. 12A, a length of the protrusion 136 may be shortened to form a rhombic-shaped protrusion, or as shown in FIG. 12B, the protrusion 136 may be formed in a spherical protrusion.

In this case, the groove 134 of the joint ball 133 may have a shape of which a width is small in an intermediate portion and is gradually increased toward both end portions of the groove 134. Thus, a structure which is advantageous for steering while transmitting a force for driving the wheel 210 may be achieved.

As described above, when each protrusion 136 has a rhombic shape or a spherical shape, each protrusion 136 is coupled to be located in an intermediate portion of the groove 134 of which a width is smallest in the length direction.

In addition, as shown in FIG. 11, the intermediate portion of each protrusion 136 may be coupled to be located in the intermediate portion of each groove 134.

FIG. 13 is a perspective view illustrating the electronic brake 150 in the e-corner module 100 according to the embodiment of the present disclosure, and FIG. 14 is a diagram illustrating an operating state of the electronic brake 150 in the e-corner module 100 according to the embodiment of the present disclosure.

The electronic brake 150 includes a linear actuator 152 of which driving is controlled according to a control signal output from a controller 155.

The linear actuator 152 is provided such that driving thereof is controlled by a control signal output from the controller 155, and the linear actuator 152 is accommodated in a brake case 151 together with the controller 155 for driving and control of the linear actuator 152.

The brake case 151 may be integrally mounted to the case 120 in which the in-wheel motor 130 and the steering motor 140 are accommodated. In this case, the brake case 151 may be mounted by being integrally fixed to the case cover 122 (see FIG. 4).

During braking, the electronic brake 150 is configured to hold the rotating shaft 132 of the in-wheel motor 130. Specifically, the electronic brake 150 is configured to generate a friction braking force with respect to the rotating shaft 132 of the in-wheel motor 130 in a manner in which a friction plate 154 is pressed against the rotating shaft 132 of the in-wheel motor 130.

To describe the above configuration, the linear actuator 152 has the driving shaft 153 which is linearly moved frontward or rearward during driving, and the friction plate 154 is integrally fixed to the driving shaft 153.

In addition, an opening 123a in FIGS. 7B and 14 is formed at one side of the passage 123 of the case cover 122 to expose a portion of the rotating shaft 132 of the in-wheel motor 130, which passes through the interior of the passage 123. As the driving shaft 153 is moved frontward or rearward when linear actuator 152 is driven, the friction plate 154 is moved between the interior and an exterior of the passage 123 through the opening 123a.

When the driving shaft 153 of the linear actuator 152 is moved frontward, the friction plate 154 is moved toward the exterior of the passage 123 to be separated from the rotating shaft 132 of the in-wheel motor 130. In this case, the rotating shaft 132 of the in-wheel motor 130 becomes a state of being separated from the friction plate 154 so that rotation holding and braking of the friction plate 154 with respect to the rotating shaft 132 of the in-wheel motor 130 are not performed.

In contrast, when the driving shaft 153 of the linear actuator 152 is moved rearward, the friction plate 154 is moved toward the interior of the passage 123 to come into contact with the rotating shaft 132 of the in-wheel motor 130. In this case, the friction plate 154 is pressed against the rotating shaft 132 of the in-wheel motor 130 so that the rotation holding and the braking of the friction plate 154 with respect to the rotating shaft 132 of the in-wheel motor 130 are performed.

That is, the friction plate 154 is strongly pressed against the rotating shaft 132 of the in-wheel motor 130 so that a braking force is generated. In the present disclosure, since the rotating shaft 132 of the in-wheel motor 130 is directly braked instead of braking the wheel 210 itself due to friction, a small-sized friction plate 154 and a small-sized linear actuator 152 may be employed, and it is possible to brake the wheel 200 with a device of which layout is significantly reduced.

In addition, in the electronic brake 150 having the above configuration, since the rotating shaft 132 outputting the rotating force from the in-wheel motor 130 is immediately directly braked, braking efficiency is high, and during braking, since deceleration of the in-wheel motor 130 may be performed, and simultaneously, the rotation holding (braking) with respect to the rotating shaft 132 of the in-wheel motor 130 may be performed, a braking distance may be significantly reduced.

To describe the operating state, as shown in a left side of FIG. 14, the friction plate 154 is spaced and separated from the rotating shaft 132 of the in-wheel motor 130 in a state in which the linear actuator 152 is not operated as usual so that the rotating shaft 132 of the wheel motor 130 may become a state of being freely rotated without generation of a braking force.

In contrast, as shown in a right side of FIG. 14, during braking, the linear actuator 152 is operated so that the driving shaft 153 is moved rearward. In this case, since the friction plate 154 is pulled to be pressed against the rotating shaft 132 of the in-wheel motor 130, the friction plate 154 holds rotation of the rotating shaft 132 of the in-wheel motor 130.

As described above, the friction plate 154 is pressed against the rotating shaft 132 of the in-wheel motor 130 and thus a frictional braking force with respect to the rotating shaft 132 of the in-wheel motor 130 is generated due to friction between the friction plate 154 and the rotating shaft 132. Consequently, braking of the vehicle wheel 200 may be performed.

Therefore, since both the in-wheel motor 130 and the steering motor 140 are mounted on the vehicle body in a state of being accommodated in a single case 120, the e-corner module 100 according to the embodiment of the present disclosure has a compact structure in which a volume and an occupied space are minimized and has a structure which is advantageous in terms of layout and package.

In particular, since the in-wheel motor 130 and the steering motor 140 are mounted on the vehicle body in the state of being accommodated in the case 120, as compared with a type in which the in-wheel motor 130 and the steering motor 140 are mounted on the wheel 210, a movement amount of the in-wheel motor 130, the steering motor 140, and the wiring is reduced so that there is an advantage in terms of durability of the in-wheel motor 130, the steering motor 140, and the wiring.

In addition, in the e-corner module 100 according to the embodiment of the present disclosure, since the in-wheel motor 130 and the steering motor 140 may be located farther from the vehicle wheel 200 rotated at a high speed as compared with the conventional configuration, the wiring is easily configured.

Further, since the steering is performed by converting an output of the steering motor 140 into a high torque using the bevel gear mechanism, a size of the steering motor 140 may be reduced so that there are advantages in that high efficiency steering may be possible using the bevel gear mechanism and a boosting principle and a large steering force may be generated even with a force of a small steering motor.

Further, in order to transmit the rotating force of the in-wheel motor 130 to the vehicle wheel 200, the spherical joint ball 133 is employed as a force transmission component coupled to the wheel 210 of the vehicle wheel 200, wherein the grooves 134 are formed on a surface of the spherical joint ball 133, and the ball housing 135 to which the spherical joint ball 133 is coupled is employed as another force transmission component, wherein the ball housing 135 includes the protrusions 136 which are formed in the wheel 210 of the vehicle wheel 200 and are insertable into the grooves 134 of the joint ball 133 so that power transmission may be reliably performed and the steering may be easily and smoothly performed.

Further, the spherical joint ball 133 becomes a member having strength and rigidity, and the steering plate 144 is inserted into and coupled to the wheel 210 so that precise steering of the vehicle wheel 200 may be performed and strength and rigidity of the wheel 210 and the tire 220 may be stably supported by the steering plate 144.

As described above, in accordance with a corner module of a vehicle according to the present disclosure, a wiring can be easily configured, durability of a motor and the wiring can be increased, an overall configuration can be simplified, and a more compact form can be achieved relative to a conventional form in terms of size and layout.

Although the embodiments of the present disclosure have been described in detail, the scope of the prevent disclosure is not limited to these embodiments, and various modifications and improvements devised by those skilled in the art using the fundamental concept of the present disclosure, which is defined by the appended claims, further fall within the scope of the present disclosure.

What is claimed is:

1. A corner module of a vehicle, the corner module comprising:
    a suspension configured to be coupled to a vehicle body;
    a case configured to be coupled to the suspension to be supported on the vehicle body via the suspension;
    an in-wheel motor disposed inside the case;
    a steering motor disposed inside the case;
    a first power transmission mechanism configured to connect the in-wheel motor and a vehicle wheel, and configured to transmit a rotating force of the in-wheel motor to the vehicle wheel to drive the vehicle wheel; and
    a second power transmission mechanism configured to connect the steering motor and the vehicle wheel, and configured to transmit a rotating force of the steering motor to the vehicle wheel to steer the vehicle wheel.

2. The corner module of claim 1, wherein the suspension includes:
    a vehicle body fixing part configured to be coupled to the vehicle body;
    a fixing shaft configured to be integrally connected to the vehicle body fixing part;
    a case connecting shaft configured to be integrally connected to the case and slidably coupled to the fixing shaft; and
    a spring arranged between the vehicle body fixing part and the case.

3. The corner module of claim 2, wherein the case connecting shaft has a pinhole defined therein,
    wherein the fixing shaft has:
        a slot hole defined therein in an axial direction; and
        a separation prevention pin extending through the slot hole and the pinhole, and
    wherein, when the fixing shaft and the case connecting shaft slide, the separation prevention pin is configured to move along the slot hole in a state of being inserted into the pinhole.

4. The corner module of claim 1, wherein the in-wheel motor is disposed downward of an interior of the case, and
    wherein the steering motor is disposed above the in-wheel motor in the interior of the case.

5. The corner module of claim 1, wherein the first power transmission mechanism includes:
    a rotating shaft of the in-wheel motor;
    a joint ball configured to be integrally disposed on the rotating shaft of the in-wheel motor; and
    a ball housing disposed in a wheel of the vehicle wheel and configured to accommodate the joint ball, and
    wherein the joint ball and the ball housing are configured to transmit the rotating force of the in-wheel motor.

6. The corner module of claim 5, wherein the joint ball comprises a plurality of elongated grooves, each having a predetermined width and a predetermined length, defined on a surface of the joint ball,
    wherein the ball housing comprises a plurality of protrusions corresponding the plurality of grooves of the joint ball, respectively, protruding on an inner surface of the ball housing, and
    wherein, in a state in which the joint ball is disposed in the ball housing, the rotating force of the in-wheel motor is transmittable due to the plurality of grooves and the plurality of protrusions.

7. The corner module of claim 6, wherein each of the plurality of protrusions has an elongated shape having a predetermined width and a predetermined length.

8. The corner module of claim 6, wherein each of the plurality of grooves has a shape of which a width is smallest in an intermediate portion in a length direction and is gradually increased toward both ends of the groove.

9. The corner module of claim 8, wherein each of the plurality of protrusions has an elongated shape, a rhombic shape, or a spherical shape, which has a predetermined width and a predetermined length, and
    wherein, when each of the plurality of protrusions has the elongated shape, the protrusion has a shape of which a width is largest in an intermediate portion in a length direction and is gradually decreased toward both ends of the protrusion.

10. The corner module of claim 9, wherein, when each of the plurality of protrusions has the rhombic shape or the spherical shape, each of the plurality of protrusions is coupled to be located in the intermediate portion in the length direction of each of the plurality of grooves, respectively, and
    wherein, when each of the plurality of protrusions has the thin elongated shape, an intermediate portion of each of the plurality of protrusions in the length direction is coupled to be located in the intermediate portion in the length direction of each of the plurality of grooves, respectively.

11. The corner module of claim 1, wherein the second power transmission mechanism includes:
    a rotating shaft of the steering motor;
    a first gear configured to be integrally disposed on the rotating shaft of the steering motor;
    a steering plate configured to be coupled to a wheel of the vehicle wheel and rotated together with the vehicle wheel about a steering axis when steering; and
    a second gear configured to be integrally disposed in the steering plate and configured to transmit a rotating force of the first gear to the steering plate in a state of being engaged with the first gear such that the steering plate and the wheel of the vehicle wheel are rotated about the steering axis.

12. The corner module of claim 11, wherein the first gear and the second gear are gears comprising a bevel gear mechanism in a state of being engaged with each other.

13. The corner module of claim 11, wherein, when the wheel of the vehicle wheel is rotated about a driving shaft due to the rotating force of the in-wheel motor, a first bearing is configured to be arranged between the wheel of the vehicle wheel and the steering plate such that only the wheel of the vehicle wheel is rotated about the driving shaft.

14. The corner module of claim 11, wherein the steering plate comprises a protrusion,
wherein the case comprises a tube-shaped passage through which the rotating shaft of the in-wheel motor extends, and
wherein the protrusion of the steering plate is located above the passage and configured to be supported by the passage.

15. The corner module of claim 14, wherein the passage has a second bearing disposed therein,
wherein the protrusion of the steering plate is configured to be supported by the second bearing, and
wherein the second gear is configured to be integrally disposed on an upper surface of the protrusion.

16. The corner module of claim 1, further comprising an electronic brake disposed on the case and configured to apply a frictional braking force to the rotating shaft of the in-wheel motor.

17. The corner module of claim 16, wherein the electronic brake includes:
a linear actuator having a driving shaft configured to be linearly moved forward or rearward during driving; and
a friction plate configured to be integrally connected to the driving shaft of the linear actuator and pressed against the rotating shaft of the in-wheel motor to apply the frictional braking force.

18. The corner module of claim 17, wherein the case further comprises a tube-shaped passage through which the rotating shaft of the in-wheel motor extends, and
wherein the tube-shaped passage comprises an opening defined at one side thereof so that the friction plate is configured to be pressed against the rotating shaft of the in-wheel motor through the opening of the tube-shaped passage.

* * * * *